United States Patent
Langer et al.

(10) Patent No.: US 11,170,600 B2
(45) Date of Patent: Nov. 9, 2021

(54) SYSTEM AND METHOD FOR VENDING CONSUMER GOODS IN A VEHICLE

(71) Applicants: HYUNDAI MOTOR COMPANY, Seoul (KR); KIA MOTORS CORPORATION, Seoul (KR)

(72) Inventors: Ingmar Langer, Darmstadt (DE); Lukas Gass, Mainz (DE); Frank Wolf, Dreieich-Sprendlingen (DE); Michael Schreiber, Frankfurt am Main (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/870,474

(22) Filed: May 8, 2020

(65) Prior Publication Data
US 2021/0287477 A1    Sep. 16, 2021

(30) Foreign Application Priority Data

Mar. 13, 2020   (DE) .......................... 102020203235.1

(51) Int. Cl.
| G06F 7/08 | (2006.01) |
| G06K 5/00 | (2006.01) |
| G07F 17/00 | (2006.01) |
| G07F 7/08 | (2006.01) |
| G06K 9/00 | (2006.01) |
| G06Q 20/10 | (2012.01) |

(52) U.S. Cl.
CPC ..... *G07F 17/0042* (2013.01); *G06K 9/00838* (2013.01); *G06Q 20/102* (2013.01); *G07F 7/0866* (2013.01)

(58) Field of Classification Search
CPC combination set(s) only.
See application file for complete search history.

(56) References Cited

U.S. PATENT DOCUMENTS

| 2013/0274917 A1 | 10/2013 | Shimmerlik |
| 2019/0034857 A1* | 1/2019 | Ferguson ............. G05D 1/0061 |
| 2019/0205854 A1* | 7/2019 | Baren ................. G06Q 20/3224 |
| 2019/0205961 A1* | 7/2019 | Baren ................... G06Q 20/322 |
| 2019/0311417 A1* | 10/2019 | Randisi ................... H04W 4/23 |

* cited by examiner

*Primary Examiner* — Tuyen K Vo
(74) *Attorney, Agent, or Firm* — McDonnell Boehnen Hulbert & Berghoff LLP

(57) ABSTRACT

A system for vending consumer goods in a vehicle includes a container for storing consumable units of at least one sort of consumer goods, a sensor system including at least one first sensor configured to detect removal of a consumable unit from the container by a consumer, and a computer system connected to the sensor system via a data network. The computer system includes a user database storing a user account assigned to the consumer and a service database storing a price for each consumable unit. Each user account comprises a service payment account listing services and a corresponding amount of money due for each service. The computer system is configured to retrieve from the service database a price for the removed consumable unit and to charge the service payment account of the consumer with an amount of money corresponding to the price of the removed consumable unit.

9 Claims, 5 Drawing Sheets

SYSTEM AND METHOD FOR VENDING CONSUMER GOODS IN A VEHICLE

CROSS-REFERENCE TO RELATED APPLICATION

The present application claims priority to and the benefit of German Patent Application No. 102020203235.1, filed Mar. 13, 2020, which is incorporated herein by reference in its entirety.

TECHNICAL FIELD

The present disclosure relates to a system and a method for vending consumer goods in a vehicle, in particular in a passenger vehicle such as a car or a van providing transportation services to one or more passengers.

BACKGROUND

The statements in this section merely provide background information related to the present disclosure and may not constitute prior art.

Ride hailing and ride pooling are individual transportation services for passengers. In ride hailing, a user or a common group of users books a vehicle for a single ride from one place to another. In ride pooling, typically, various passengers sharing sections of a common route individually book a ride in a vehicle driving on said route. Such services are commercially offered by providers which operate the vehicles with drivers. In order to ease booking and organizing of rides, the providers usually offer service applications for smart phones which enable the passengers or users to book their desired ride.

In order to improve comfort in the vehicles operated in ride haling or ride pooling services, it is desirable to sell snacks or other consumer goods. However, it is also desirable to unburden the driver from other tasks than driving in order to ensure a high safety level.

US 2013/0274917 A1 describes a vending machine in a taxi for vending snacks or other items, wherein a passenger can select an item on a display of the vending machine and make a corresponding input. A payment indicator is received by the vending machine and, upon receipt of the payment indicator, the selected item is dispensed to the passenger. Payment can be made via credit card directly on the machine or together with paying the fare for the ride.

SUMMARY

It is one of the ideas of the present disclosure to find improved solutions for automated selling of consumer goods in vehicles, in particular in vehicles operated in ride haling or ride pooling services.

The present disclosure relates to a system for vending consumer goods in a vehicle and a method for purchasing consumer goods in a vehicle.

In some forms of the present disclosure, a system for vending consumer goods in a vehicle comprises a container for storing consumable units of at least one sort of consumer goods, a sensor system including at least one first sensor configured to detect removal of a consumable unit from the container by a consumer, and a computer system connected to the sensor system via a data network. The computer system includes a user database storing a user account assigned to the consumer and a service database storing a price for each consumable unit available in the container, each user account comprising a service payment account listing services booked by the consumer and a corresponding amount of money due for each service. The computer system is configured to retrieve from the service database a price for the removed consumable unit detected by the at least one first sensor and to charge the service payment account of the consumer with an amount of money corresponding to the price of the removed consumable unit.

In some forms of the present disclosure, a method for purchasing consumer goods in a vehicle is provided. The method according to this aspect may be carried out, for example, by means of the system according to the first aspect of the disclosure. Thus, any features and advantages disclosed for the system are also disclosed for the method. The method comprises detecting, by means of a sensor system, removal of a consumable unit of consumer good from a container by a consumer, the container being positioned in a vehicle, retrieving, by means of a computer system connected to the sensor system, from a service database of the computer system a price for the removed consumable unit, and charging, by means of the computer system, a service payment account of a user account of the consumer stored in a user database of the computer system with an amount of money corresponding to the price of the removed consumable unit.

The present disclosure relates to detect removal of an item or unit of consumer good from a container provided in the vehicle by means of a first sensor and to automatically charge a service payment account of the consumer who removed the consumable unit with the corresponding amount of money.

The first sensor is connected to a computer system, e.g. via a wired or a wireless connection. The computer system may include a server comprising a data memory storing various data bases and software, and one or more processing units, such as a CPU or similar. The computer system at least includes a user database where a user account of the consumer is stored, wherein the user account may include personal information of the user such as a name, address, email address, and so on. In particular, the user account includes a service payment account which lists the services which the user has booked. The service payment account may form an electronic invoice for the services booked by the user. For example, the service payment account may be linked to an electronic payment service which balances the fees listed in the service payment account of the consumer, e.g. to a credit card account, a PayPal account, or similar. The computer system and the sensor system, in particular the first sensor, may communicate to each other via a data network, e.g. via internet. For example, the sensor may be configured to establish a data communication to the computer system via a mobile internet access device of the vehicle, e.g. via a SIM card, or another communication interface provided in the vehicle. The first sensor is configured to detect removal of a consumable unit and, optionally, may be configured to identify a specific type of removed consumable unit.

By the above described system and method, automatic dispensing and payment of consumer goods is enabled in vehicles. One advantage of the system is that the consumer simply can take out the consumable unit from the container and payment will be automatically made by the computer system via his service payment account. Further, the driver of the vehicle is not necessarily involved in selling, whereby the safety level is further increased. Moreover, within the vehicle, only simple sensors can be used, while the computer system may be realized remote as a server or similar, since a communication between the sensor system and the computer system is established via a data network, e.g. via internet.

Further forms of the present disclosure are subject of the further sub-claims and of the following description, referring to the drawings.

In some forms of the present disclosure, the at least one first sensor may comprise one or more of a camera positioned such that the container is in a field of view of the camera, a weight sensor placed at the bottom of the container, and a light barrier positioned adjacent to or within the container.

A camera may, for example, include a barcode reader configured to read a barcode attached to the removed consumable unit. Alternatively, the camera may be positioned such that it captures a picture of the interior of the container, wherein each consumable unit is placed on a specific location within the container. When one unit is removed, the picture captured by the camera shows a corresponding difference and, from the position of the difference, removal per se and, optionally, the type of removed consumable unit can be determined.

Weight sensors may be used according to the same principle. For example, one weight sensor may be placed at the bottom of the container, wherein, when a unit is removed from the container, the weight sensor detects a change in weight so that removal can be detected. When each type of consumable unit present in the container has a different weight, it can also be determined which type of unit has been removed from the detected change of weight. Otherwise, it is possible to place one weight sensor on each bottom of a shelf of the container, so that each weight sensor only detects a change in weight in this shelf. When it is known which shelf stores which type of consumable unit, it can easily be determined which consumable unit has been removed.

Light barriers may be located at an opening of the container. It is possible to use one light barrier to detect removal of any consumable unit per se or, optionally, to provide one light barrier per shelf in order to detect removal of specific consumable units, as described above for the weight sensors.

In some forms of the present disclosure, the first sensor may comprise a barcode reader integrated in a handheld mobile device of the consumer, the barcode reader being configured to read a barcode attached to and identifying the removed consumable unit, wherein the handheld mobile device is configured to establish a data communication with the computer system via the data network. For example, the user may remove a consumable unit from the container and scan a barcode provided on the removed unit by aid of his smart phone, e.g. by activating a barcode reader via an app of the ride hailing or ride pooling provider installed on the phone. Thereby, the consumable unit is identified and the corresponding information is transmitted to the computer system which charges the service payment account of the consumer accordingly. In some forms of the present disclosure, not only the barcode reader of the handheld mobile device of the consumer may form a first sensor but, optionally, additional first sensors as described above may be employed in order to ensure detection of removal also when the consumer does not scan the barcode.

In some forms of the present disclosure, the sensor system may comprise at least one second sensor connected to the computer system via the data network and configured to identify the consumer among at least two users present in the vehicle, wherein the user database stores a user account for each user present in the vehicle, and wherein the computer system is configured to select the user account of the user who has been identified as the consumer by the at least one second sensor. For example, in ride pooling, where various users are present in the car who have individually booked a ride, it is advantageous to be able to allocate removal of consumable unit from the container to a specific user. In some forms of the present disclosure, therefore, one or more second sensors are provided which are configured to identify the user who has removed the consumable unit. This user, then, can be classified as the consumer and the above described procedures can be applied.

Similarly, in some forms of the present disclosure, the method may further include identifying, by means of the sensor system, a consumer who removed the consumable unit from the container among at least two users present within the car, and selecting, by means of the computer system, a user account assigned to the user who has been identified as the consumer from a plurality of user accounts stored in the user database.

In some forms of the present disclosure, the computer system may be configured to issue a warning signal, when the consumer has not been identified by the at least one second sensor. The warning signal may, for example, be transmitted to vehicle via the data network and may cause displaying a corresponding message to the driver. It is also possible that the warning signal is transmitted to a handheld mobile device of each user present in the vehicle where it causes displaying a corresponding message to the users.

In some forms of the present disclosure, a handheld mobile device may be assigned to each user present in the vehicle, wherein the computer system is configured to establish a data communication with the mobile devices, for example via the data network, and send an approval request to each mobile device when the consumer was not identified by the second sensor, the approval request requiring the user to approve or deny removal of the consumable unit by making an input to the mobile device, the computer system being further configured to receive an approval notification from the mobile device together with a user identification identifying the user as the consumer, when the user has approved removal. That is, when the second sensor was not able to identify the user and when removal of consumable unit was detected, the computer system sends a message to the handheld mobile devices, e.g. the smart phones, of each user present in the vehicle, the message requesting an input from the users to approve or deny removal. When one user approves removal by making a corresponding input to his phone or device, the computer system receives a corresponding notification which identifies the user and proceeds with the above described procedures. When, however, none of the users approves, e.g. because all users deny removal, a warning signal may be issued as described above.

In some forms of the present disclosure, the second sensor may be realized as a notification module of a handheld mobile device assigned to a user, the notification module being configured to send a user identification to the computer system, the user identification identifying the user as the consumer. In some forms of the present disclosure, the consumer may send a message with his identity to the computer system.

Optionally, the notification module may be configured to send the user identification in response to scanning the barcode by the barcode scanner. That is, when the first sensor is realized as barcode scanner of a handheld mobile device, the user may scan a barcode on the removed consumable unit, wherein scanning the barcode automatically triggers the notification module to send the user identification to the computer system.

In some forms of the present disclosure, the second sensor may comprise one or more of at least one sensor configured to track each user present in the vehicle, a seat belt sensor configured to sense a closing state of seat belt of a seat assigned to each user, a seat occupancy sensor configured to sense an occupancy of a seat assigned to each user. Identification of the user is possible in many ways, wherein most methods may use seat information which defines which user sits on which seat in the vehicle. For example, tracking sensors such as a camera, a time-of-flight ("ToF") sensor, a radar sensor, or a lidar sensor are configured to track movement of individual persons within the vehicle. Thereby, a very reliable identification of the consumer is possible. Seat occupancy sensors, which for example may be pressure sensor integrated in the seat, and seat belt sensors detect occupancy of a seat or the closing state of the seat belt. When it is detected that a person, to which the seat is assigned, leaves its seat, e.g. based on detecting opening of the seat belt, it can be conducted that this person is the consumer. Seat belt sensors and seat occupancy sensors are rather cheap and, therefore, provide a very economical way to identify the consumer.

For example, one or more cameras monitoring the interior of the vehicle may track movement of the users within the car, e.g. by means of known image recognition algorithms.

It is also possible to use seat belt sensors to determine which user has removed the consumable unit. For example, opening of the seat belt may be determined for a specific user, wherein this user is, in turn, identified as the consumer. This is particular practical in situations where the users are required to leave their seat to reach the container. In the same way, seat occupancy sensors may be used.

In some forms of the present disclosure, the computer system may be configured to issue a payment information signal, when the service payment account of the consumer has been charged. This payment information signal may, for example, be sent to a handheld mobile device of the user and/or to the vehicle. In both cases, the payment information signal may cause displaying a corresponding information.

Generally, a handheld mobile device may be any electronic device suitable to be carried by a person and configured to send, receive, and process data. In particular, a handheld mobile device may include smart phones, tablet PCs, smart watches, portable music players, or similar.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
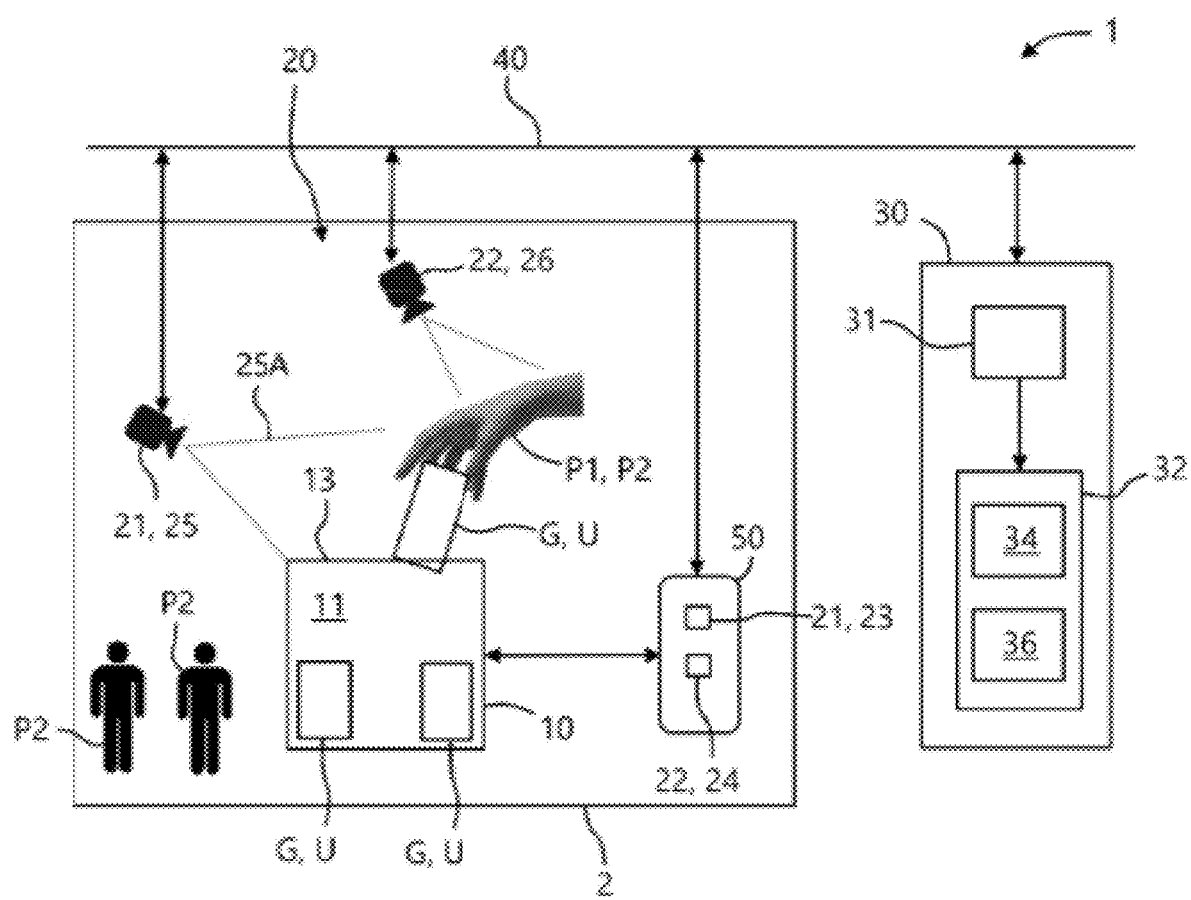
FIG. 1 shows a schematic view of a system for vending consumer goods in a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic view of a system 1 for vending consumer goods G in a vehicle 2. Consumer goods G may for example be snacks, such as crackers, chips, chocolate, chewing gums, and so on, drinks, tobacco products, and so on. The consumer goods G are sold or dispensed in consumable units U, that is, in the form of a closed package, can, or similar which contains a defined amount of consumable material. Selling consumer goods G in vehicles 2 for passenger transportation, e.g. in busses, taxis, or vehicles operated in ride pooling or ride haling services, increases comfort for the passengers or users P2. Even though the present disclosure mostly relates to street vehicles 2, the present disclosure is not limited thereto. For example, the present disclosure may also be used in trains, aircrafts or other vehicles 2. As will be explained in more detail below, the system 1 provides solutions for automatically detecting purchase of a consumable unit U by a consumer P1 and for automated payment of the purchased consumable unit U.

As exemplarily shown in FIG. 1, the system 1 may comprise a container 10 for storing consumable units U of at least one sort or type of consumer goods G, a sensor system 20, a computer system 30. The sensor system 20 and the computer system 30 each may comprise interfaces (not shown) which are configured for data communication via a data network, e.g. the internet, a CAN-Bus system, Ethernet, Bluetooth, or similar.

The container 10 is only schematically shown in FIG. 1 as a block and may be any type of container configured for storing multiple consumable units U of consumer goods G. For example, the container 10 may define an interior space 11 for receiving and storing the consumer goods G. The interior space 11 may optionally be divided in several shelfs 12, wherein each shelf 12 may, for example, receive one sort or type of consumer good G. For example, drinks may be received in one shelf 12, while crackers are received in another shelf 12, and so on. The interior space 12 is accessible via an opening 13 through which a consumer P1 may remove one or more consumable units U, as is schematically shown in FIG. 1 which symbolically depicts a consumer P1 as a hand. The opening 13, of course, may be selectively covered or opened by a door (not shown).

As is schematically shown in FIG. 1, the container 10 is positioned or integrated within the vehicle 2, in particular within the interior of the vehicle 2. For example, in an automobile, the container 10 may be realized as a box integrated within a center console, as a holder attached to a door of the automobile, or similar.

Figure 3:
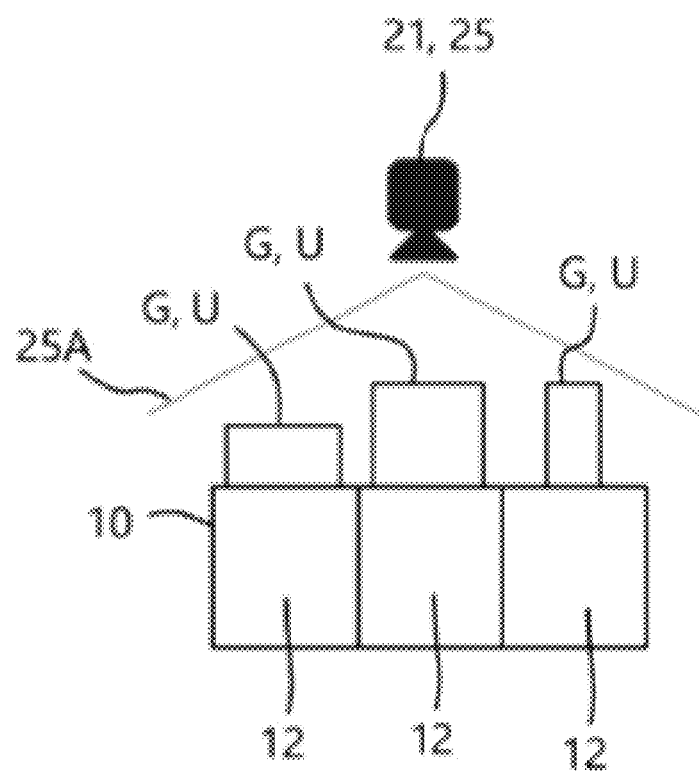
FIG. 3 shows a schematic view of the container of a system in one form of the disclosure.

The sensor system 20 may include at least one first sensor 21. Optionally, the sensor system 20 may further include at least one second sensor 22. The one or more first sensors 21 are configured to detect removal of a consumable unit U from the container 10 by a consumer P1. As exemplarily shown in FIG. 1, the sensor system 20 may comprise a first sensor 21, for example in the form of a camera 25. The camera 25 is positioned such that that the container 10, in particular the opening 13 of the container 10, is in a field of view 25A of the camera 25. As is shown in more detail in FIG. 3, the camera 25 may be positioned opposite to the opening 13 so that a picture captured by the camera 25 contains all shelfs 12 of the container 10. When one consumable unit U is removed from the container 10, removal can be detected in the picture captured by the camera 25. When it is known which type or sort of consumer good G is stored within each shelf 12, it is also possible to determine the type of consumer good G of which a consumable unit U has been removed. Thus, it may also be possible to identify the type of consumable unit U.

Figure 2:
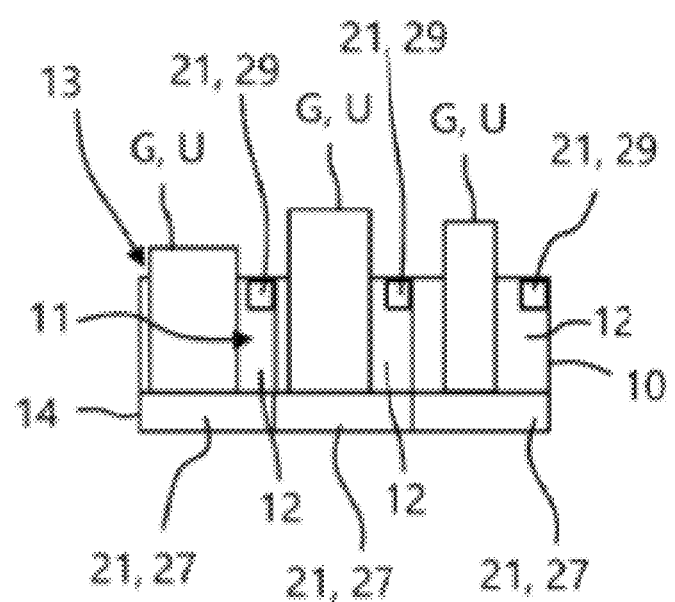
FIG. 2 shows a schematic view of a container of a system in one form of the disclosure.

As is schematically shown in FIG. 2, one or more first sensor 21 may also be realized as weight sensors 27 or light barriers 29. Generally, only one weight sensor 27 and/or only one light barrier 29 may be provided. FIG. 2 only exemplarily shows that one weight sensor 27 per shelf 12 and one light barrier 29 per shelf 12 is provided. Of course it is also possible to leave the light barriers 29 or the weight sensors 27 away. The weight sensors 27 may be placed at a bottom 14 of the container 10 so as to detect a weight of consumable units U present within the interior space 11 of the container 12 or, optionally, present in each shelf 12. When a consumable unit U is removed, the weight captured by the weight sensor 27 changes and, thereby, removal of a consumable unit U can be detected. When one weight sensor 27 is provided at each shelf 12 and when it is known which type or sort of consumer good G is stored within each shelf 12, it is also possible to determine the type of consumer good G of which a consumable unit U has been removed. Thus, it may also be possible to identify the type of consumable unit U.

The light barriers 29 may be positioned adjacent to the opening 13 of the container 10, as is exemplarily shown in FIG. 2. Generally, a light barrier 29 may be positioned adjacent to or within the container 10. The light barriers 29 are configured to emit a light beam, detect interruption of the light beam, and generate a signal upon detecting the interruption, that is, upon removal of a consumable unit U from the container. When one light barrier 29 is provided at each shelf 12 and when it is known which type or sort of consumer good G is stored within each shelf 12, it is also possible to determine the type of consumer good G of which a consumable unit U has been removed. Thus, it may also be possible to identify the type of consumable unit U.

As is shown further in FIG. 1, the first sensor 21 may also comprise a barcode reader 23 integrated in a handheld mobile device 50 of the consumer P1. The barcode reader 23 is configured to read a barcode attached to the removed consumable unit U. The handheld mobile device 50 may, for example, be a smart phone. The handheld mobile device 50 comprises a processor (not shown) and a data memory (not shown) storing software executable by the processor. For example, the handheld mobile device may be configured to run a service app which causes the barcode reader 23 to read the barcode attached to the consumable unit U. Thereby, removal of the consumable unit U may be detected and, based on the information contained within the barcode, the removed consumable unit U can be identified.

The optional one or more second sensors 22 are configured to identify the consumer P1, who has removed the consumable unit U, among at least two passengers or users P2 present in the vehicle 2. The users P2 are merely symbolically shown in FIG. 1. In order to allocate or assign removal of a consumable unit U from the container 10 to a specific person among the plurality of users P2, who is then classified or identified as the consumer P1, the second sensor 22 may rely on information showing a current location of the user P2 within the interior of the vehicle 2. For example, as exemplarily shown in FIGS. 1 and 4, the second sensor 22 may comprise a camera 26 capturing a video of the interior of the vehicle 2. Individual passengers or users P2 may be marked within the captured video by aid of known image recognition algorithms so that their movement within the interior can easily be tracked. This allows to determine when an individual user P2 is present at or accessing the container 10. Consequently, removal of a consumable unit U from the container 10 can be allocated to an individual user P2 who is identified as the consumer P1.

Figure 4:
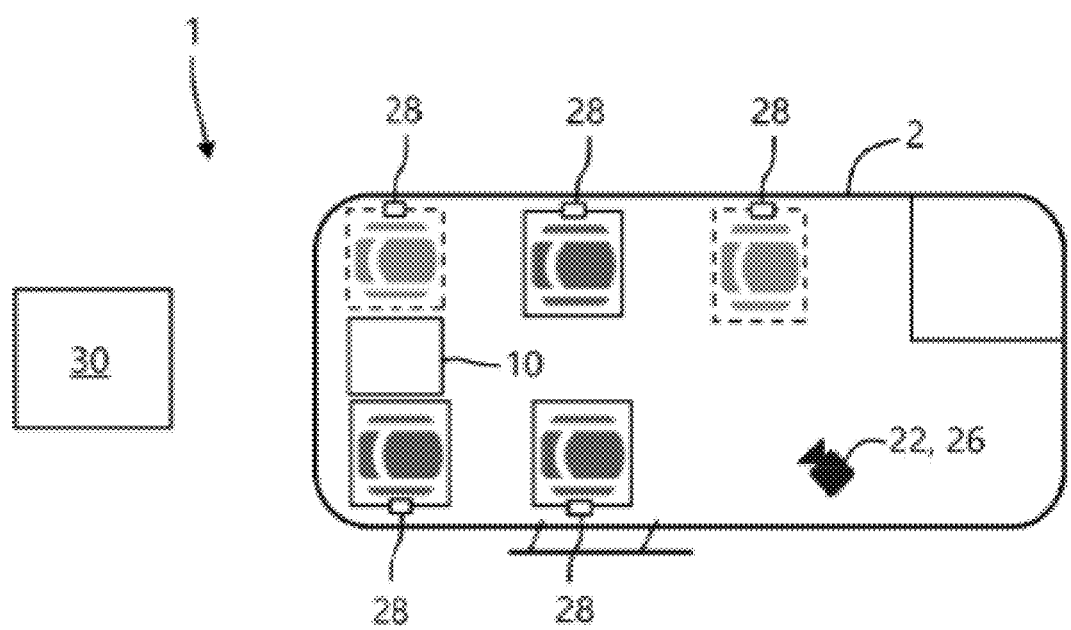
FIG. 4 shows a view of an interior of a vehicle employing the system and/or method in one form of the disclosure.

However, the present disclosure is not limited to a camera 26 as the second sensor 22. Generally, the second sensor 22 may be configured to track movement of each user P2 present in the vehicle 2. For example, the second sensor 22 may also be a time-of-flight sensor, a radar sensor, or a lidar sensor. Additionally, or alternatively, the second sensor 22 may also include a seat belt sensor configured to sense a closing state of seat belt of a seat assigned to each user P2 or a seat occupancy sensor, e.g. a weight sensor mat integrated in the seat, configured to sense an occupancy of a seat assigned to each user P2. FIG. 4 exemplarily shows a principle of identifying the consumer P1 among various passengers P2 present within the vehicle by aid of seat belt sensors or seat occupancy sensors 28. In the example of FIG. 4, in total five passenger seats 3 are provided within the interior of the vehicle 2. Of course, another number of passenger seats 3 is possible. The container 10 is located between two passenger seats 3 forming a row of seats and is only accessible for the passengers sitting in those seats without being required to leave the seat. In FIG. 4, the occupied seats 3 are marked by a frame of dashed lines while unoccupied seats 3 are marked by a frame of full lines. The identity of the users P2 sitting in the occupied seats is known, e.g. from a booking of the users P2. Thus, when both seat occupancy sensors 28 detect presence of a passenger on the seat 3 and when removal of a consumable unit U from the container 10 is detected, it is clear that the passenger P2 sitting in the seat 3 next to the container is the consumer P1 since the container 10 is not accessible for the passenger P2 sitting in the other, remote occupied seat 3 without leaving the seat 3. On the other hand, when it is detected by sensor 28 that the passenger P2 in the seat remote of the container 10 has left is seat and when removal of a consumable unit U from the container 10 is detected, it may be conducted that the passenger P2 of the remote seat is the consumer P1.

Moreover, it is also possible to use a handheld mobile device 50 assigned to each user P2 as a second sensor 22. For example, the mobile device 50 may include a notification module 24 functioning as the second sensor 22. The notification module 24 is configured to issue a signal containing a user identification, e.g. in the form of a phone number or any other information assigned to and allowing identification of the user P2. For example, it is possible that the notification module 24 is activated in response to scanning a barcode attached to the removed consumable unit U with the barcode scanner 23 forming the first sensor 21. Thereby, a data package can be generated by the handheld mobile device 50 which includes information on which consumable unit U has been removed by which user P2.

The computer system 30 may include a server or any other computer infrastructure configured to execute software instructions and to generate data output, e.g. in the form of electric, optic, or magnetic signals. Generally, the computer system 30 may comprise a processor 31, e.g. in the form of one or more CPUs or similar, and a non-volatile data memory 32, e.g. a hard drive, a flash memory, or similar. The computer system 30 may be configured to establish a data communication with the sensor system 20 and, optionally, with the handheld mobile devices 50 of the users P2 present in the vehicle 2 via a data network 40, e.g. via the internet. For example, the vehicle 2 may comprise a SIM card enabling internet access for various components of the vehicle 2, e.g. for the sensor system 20. It is also possible that the handheld mobile device 50 establishes a data communication with the sensor system 20, e.g. via WiFi, Bluetooth, NFC, or other preferably wireless data connections, and, in turn, transmits the data captured by the sensor system 20 to the computer system 30.

As is schematically shown in FIG. 1, the data memory 32 of the computer system 30 may store a user database 34 and a service data base 36. Of course, additional data bases may be stored in data memory 32. The user database 34 stores or contains a user account assigned to the consumer P1. Generally, the user database 34 may store a plurality of user accounts of users or passengers who are present within the vehicle 2 or who have generated a user account in the user database 34. Each user account includes a service payment account listing services booked by the consumer P1 or individual passenger P2 and a corresponding amount of money due for each service. For example, a passenger or user P2 may have booked a ride with a vehicle 2, for example via an app installed on his handheld mobile device 50. This ride, upon booking, is then listed in the service payment account of the user account of the user together with the amount of money due for the ride. The user account may include further information, e.g. such as a name, address, phone number or other information allowing identification of the user, and/or a payment method, e.g. a credit card number, PayPal, or similar.

The service database 36 stores a price for each consumable unit U available in the container 10. For example, the service database 36 may be look-up-table where a price for one consumable unit U of each individual type or sort of consumer good G stored in the container 10 is defined.

Figure 5:
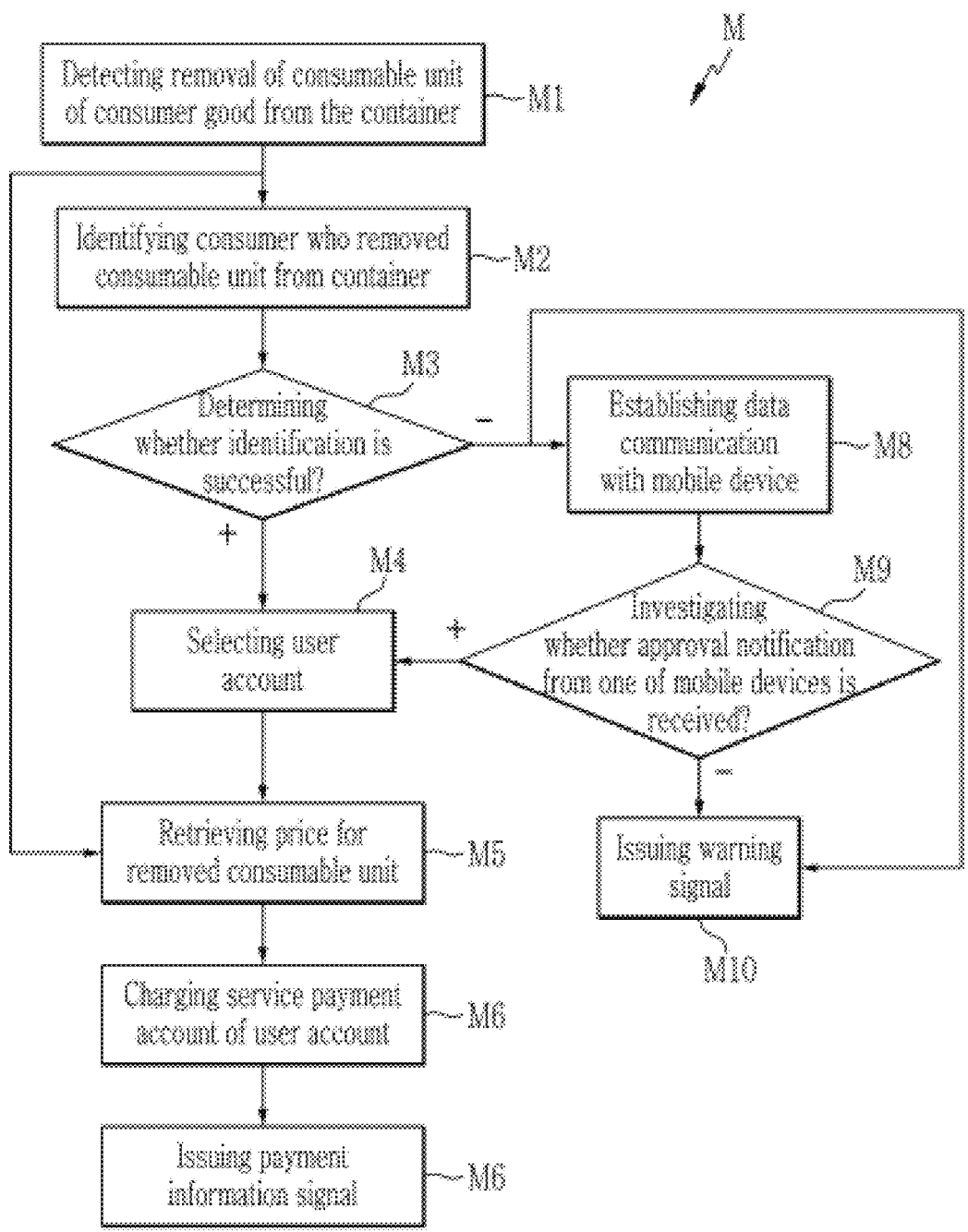
FIG. 5 shows a flowchart of a method in one form of the disclosure.

The computer system 30 is configured to execute software instructions stored in the data memory which cause the computer system 30 to perform a method M. FIG. 5 exemplarily shows a method M for vending consumer goods G in a vehicle 2, which method M may be performed by the system 1 having computer system 30.

In step M1, removal of a consumable unit U of consumer good G from the container 10 by a consumer P1 is detected by means of the first sensor 21 of the sensor system 20. For example, a consumer P1 removes a consumable unit U from the container 10 and scans a barcode of the consumable unit U with the barcode reader 23 of his smart phone, whereby the consumable unit U is detected to be removed and, optionally, its type identified, too. In addition or alternatively, removal of a consumable unit U may be detected by a camera 25, a weight sensor 27 or a light barrier 29, as described above. The detection result is transmitted to the computer system 30 via the data network 40.

In optional step M2, a consumer P1 who removed the consumable unit U from the container 10 is identified among the various users or passengers P2 present within the vehicle 2 by means of the second sensor 22. For example, a camera 26 or another tracking sensor tracks a user P2 who approaches and accesses the container 10, wherein the identity of said user P2 is known, e.g. from his seat position and/or from booking information. The result of the identification, e.g. an identity of the consumer P1 is transmitted to the computer system 30. It is also possible that, upon scanning the barcode with the handheld device 50, the optional notification module 24 issues a user identification as described above. Generally, the handheld mobile device 50 is configured to establish a data communication with the computer system 30 via the data network 40.

In optional step M3, the computer system 30 determines whether the identification in step M2 was successful, that is, whether the second sensor 22 was able to identify the consumer P1 among the various users P2. When it is determined in step M3 that the consumer P1 has not been identified by the at least one second sensor 22, as indicated by symbol "−" in FIG. 5, the method M may advance to step M8 or directly to step M10. In step M10, the computer system 30 may issue a warning signal. Said warning signal may be sent to the vehicle 2 and cause displaying of a corresponding message to a driver of the vehicle 2. Additionally or alternatively, the computer system 30, in step M8, may establish a data communication with the mobile devices 50 assigned to each user P2 present in the vehicle 2 via the data network 40 and send an approval request to each mobile device 50, e.g. in the form of a message displayed on a display of the device 50. The approval request requires the user P2 to approve or deny removal of the consumable unit U by making an input to the mobile device 50.

After sending the approval request at step M8, the method advances to step M9. In this step, the computer system 30 investigates whether it has received an approval notification from one of the mobile devices 50. The approval notification indicates that a passenger P2 or user has approved removal of a consumable unit U and may also include a user identification identifying the user P2 as the consumer P1. The user identification may be issued for example by the notification module 24 of the user's handheld device 50 and may, for example, include a phone number or similar identification information.

If this is not the case, as indicated by symbol "−" in FIG. 5, the method advances to step M10 and generates a warning signal as described above. If receipt of an approval request is detected in step M9, as indicated by symbol "+" in FIG. 5, the method M advances to step M4. The method may also proceed with step M4 directly after step M3 when it has been determined in step M3 that a user P2 has been identified as the consumer P1 in step M3, as indicated by symbol "+" in FIG. 5.

In step M4 the computer system 30 selects a user account assigned to the user P2 who has been identified as the consumer P1 from a plurality of user accounts stored in the user database 34 based on the identity of the user P2 detected by the second sensor 22.

In the following step M5, which may also be directly entered after step M1, the computer system 30 retrieves from the service database 36 a price for the removed consumable unit U detected by the first sensor 21. That is, from the information that a consumable unit U and/or which consumable unit U has been removed, the computer system 30 can determine from the look-up-table stored in the service database 36.

In step M6, the computer system 30 charges the service payment account of a user account of the consumer P1 stored in a user database 34 with an amount of money corresponding to the price of the removed consumable unit U. For example, the computer system 30 may write an additional entry into the service payment account listing the number of consumable units U, type of consumer good G, and the corresponding amount of money due. The amount of money due may, for example, directly be balanced by a payment service linked to the user account, e.g. a credit card or PayPal account of the user.

In optional step M7, the computer system 30 may issue a payment information signal, when the service payment account of the consumer P1 has been charged. For example, the payment information signal may be sent to the handheld mobile device 50 of the consumer P1 and cause the device 50 to display a corresponding notification on a display of the device.

The description of the disclosure is merely exemplary in nature and, thus, variations that do not depart from the substance of the disclosure are intended to be within the scope of the disclosure. Such variations are not to be regarded as a departure from the spirit and scope of the disclosure.

REFERENCE LIST 1 system
2 vehicle
3 passenger seat
10 container
11 interior space
12 shelf
13 opening
20 sensor system
21 first sensor
22 second sensor
23 barcode reader
24 notification module
25 camera
25A field of view
26 camera
27 weight sensors
28 seat occupancy sensors
29 light barriers
30 computer system
31 processor
32 data memory
34 user database
36 service database
40 data network
50 handheld mobile device
G consumer goods
M method
M1—method steps
P1 consumer
P2 user
U consumable unit

What is claimed is:

1. A system for vending consumer goods in a vehicle, the system comprising:
   a container configured to store consumable units of at least a consumer good of a plurality of consumer goods;
   a sensor system including at least a first sensor configured to detect removal of a consumable unit from the container by a consumer; and
   a computer system connected to the sensor system via a data network, the computer system further comprising:
      a user database configured to store a user account assigned to the consumer; and
      a service database configured to store a price for each consumable unit available in the container, wherein each user account comprising a service payment account listing service booked by the consumer and a corresponding amount of money due for each service,
   wherein the computer system is configured to:
      retrieve from the service database a price for a removed consumable unit; and
      charge the service payment account of the consumer with an amount of money corresponding to the price of the removed consumable unit,
   wherein the sensor system further comprises:
      at least one second sensor connected to the computer system via the data network and configured to identify the consumer among at least two users present in the vehicle, wherein the user database is configured to store a user account for each user present in the vehicle, and wherein the computer system is configured to select the user account of the user who has been identified as the consumer by the at least one second sensor, wherein a handheld mobile device is assigned to each user, and
   wherein the computer system is further configured to:
      establish a data communication with the handheld mobile device via the data network;
      send an approval request to the handheld mobile device when the consumer was not identified by the second sensor, wherein the approval request requires the user to approve or deny removal of the consumable unit by making an input to the handheld mobile device; and
      receive an approval notification from the handheld mobile device together with a user identification identifying the user as the consumer when the user has approved removal.

2. The system of claim 1, wherein the first sensor comprises:
   one or more of a camera configured to position the container in a view of the camera;
   a weight sensor placed at a bottom of the container; and
   a light barrier positioned adjacent to or within the container.

3. The system of claim 1, wherein the first sensor comprises:
   a barcode reader integrated in a handheld mobile device of the consumer and configured to read a barcode attached to and to identify the removed consumable unit, wherein the handheld mobile device is configured to establish a data communication with the computer system via the data network.

4. The system of claim 3, wherein a notificator is configured to send the user identification in response to scanning the barcode by the barcode scanner.

5. The system of claim 3, wherein the second sensor comprises:
   at least one sensor configured to track each user present in the vehicle;
   a time-of-flight sensor;
   a radar sensor;
   a lidar sensor;
   a seat belt sensor configured to sense a closing state of seat belt of a seat assigned to each user; and
   a seat occupancy sensor configured to sense an occupancy of the seat assigned to each user.

6. The system of claim 1, wherein the computer system is configured to issue a warning signal when the consumer has not been identified by the at least one second sensor.

7. The system of claim 1, wherein the second sensor is configured as a notificator of a handheld mobile device assigned to a user, wherein the notificator is configured to send a user identification identifying the user as the consumer to the computer system.

8. The system of claim 1, wherein the computer system is configured to issue a payment information signal when the service payment account of the consumer has been charged.

9. A method for purchasing consumer goods in a vehicle comprising:
- detecting, by a sensor system, removal of a consumable unit of consumer good from a container by a consumer, wherein the container is positioned in the vehicle;
- retrieving, by a computer system connected to the sensor system, from a service database of the computer system a price for the removed consumable unit;
- charging, by the computer system, a service payment account of a user account of the consumer stored in a user database of the computer system with an amount of money corresponding to the price of the removed consumable unit;
- identifying, by the sensor system, a consumer who removed the consumable unit from the container among at least two users present within the vehicle;
- selecting, by the computer system, a user account assigned to the user who has been identified as the consumer from a plurality of user accounts stored in the user database;
- establishing, by the computer system, a data communication with the handheld mobile device via the data network;
- sending, by the computer system, an approval request to the handheld mobile device when the consumer was not identified by the second sensor, wherein the approval request requires the user to approve or deny removal of the consumable unit by making an input to the handheld mobile device; and
- receiving, by the computer system, an approval notification from the handheld mobile device together with a user identification identifying the user as the consumer when the user has approved removal.

* * * * *